United States Patent [19]

Asami

[11] Patent Number: 5,598,609
[45] Date of Patent: Feb. 4, 1997

[54] FASTENER INCLUDING CLIPS FOR ENGAGEMENT WITH A FLANGE

[75] Inventor: Goro Asami, Tochigi-ken, Japan

[73] Assignee: Nifco, Inc., Japan

[21] Appl. No.: 224,916

[22] Filed: Apr. 8, 1994

[51] Int. Cl.$^6$ ........................................ E04F 19/00
[52] U.S. Cl. ................................... 24/306; 24/295
[58] Field of Search ................ 24/306, 458, 293, 24/295, 563, 555, 562; 248/223.4, 224.1, 205.2, 231.8

[56] References Cited

U.S. PATENT DOCUMENTS

| | | | |
|---|---|---|---|
| 2,000,259 | 5/1935 | Smith | 248/223.4 X |
| 2,953,830 | 9/1960 | MacRae | 24/458 X |
| 2,986,793 | 6/1961 | Buzht | 24/295 X |
| 4,403,366 | 9/1983 | Lucke | 24/306 X |

FOREIGN PATENT DOCUMENTS 3-205001  9/1991  Japan.
885596  12/1961  United Kingdom ............ 24/295

Primary Examiner—James R. Brittain
Attorney, Agent, or Firm—Skjerven, Morrill, MacPherson, Franklin & Friel; Thomas S. MacDonald

[57] ABSTRACT

Provided is a fastener for temporarily securing a windshield to a vehicle body opening in a reliable manner without modifying the vehicle body structure. The base of the fastener is provided with an attaching surface adapted to be attached to a cooperating fastener on a major surface thereof, and a cavity is passed through the base substantially in parallel with the major surface. The clip may comprise a pair of clamping pieces bent from a strip of sheet metal, and one of the clamping pieces is pushed into the cavity to join the clamping piece with the base, and a flange of an opening of a vehicle body is pushed into the gap between the other clamping piece and the corresponding wall of the base. The clip may be appropriately provided with barbs to ensure secure engagement of the clip to both the base and the flange. The last mentioned wall of the base is preferably provided with a break so that the barbs provided in the clamping pieces may engage the two sides of the flange.

10 Claims, 3 Drawing Sheets

FASTENER INCLUDING CLIPS FOR ENGAGEMENT WITH A FLANGE

TECHNICAL FIELD

The present invention relates to a fastener provided with attaching means adapted to be attached to a cooperating fastener and clips for anchoring the fastener to a flange or the like, and in particular to such a fastener which is suitable for temporarily securing an windshield to an opening of a vehicle body until the windshield is permanently mounted on the vehicle body.

BACKGROUND OF THE INVENTION

In Japanese patent laid-open publication No. 3-205001 filed in the name of the assignee of the present application, there is proposed an improved plastic fastener comprising a pair of parts each having a plurality of projections on the mutually opposing surfaces. The projections are arranged in a number of rows and columns, and each provided with an enlarged head so that when the opposing surfaces are pushed against each other, the projections are caused to interlock with each other. Because the two parts can be thus readily joined together, and can be equally readily detached from each other, this fastener is highly convenient for temporarily securing one member to another before the two members are permanently joined together.

A vehicle body opening for receiving a windshield is provided with a flange of an appropriate width, and fasteners to temporarily secure the windshield in position can be conveniently attached to this flange. Conventionally, openings are provided in the flange, and legs projecting from the base of each fastener are press fitted into these openings.

However, providing openings in the flange adds to the fabrication cost, and requires the flange to have certain width for ensuring a sufficient space for the drilling or punching tool to be able to form openings in the flange.

BRIEF SUMMARY OF THE INVENTION

In view of such problems of the prior art, a primary object of the present invention is to provide a a fastener for temporarily securing a windshield to a vehicle body opening in a simple manner without changing the vehicle body structure.

A second object of the present invention is to provide a fastener for temporarily securing a windshield to a vehicle body opening in a reliable manner without changing the vehicle body structure.

These and other objects of the present invention can be accomplished by providing a fastener, comprising: a planar base carrying attaching means on a major surface thereof and provided with a cavity passed through the base substantially in parallel with the major surface, thereby defining a pair of relatively thin walls both substantially in parallel with the major surface, the attaching means being adapted to be temporarily attached to cooperating attaching means provided on a cooperating fastener; and a clap including a pair of clamping pieces having a C-shaped cross-section and provided with a certain elasticity which urges the clamping pieces toward each other; one of the relatively thin walls being interposed between the clamping pieces by pushing one of the clamping pieces into the cavity; the clamping pieces being provided with a first barb for engaging one of the clamping pieces with one of the relatively thin walls, and a second barb for engaging one of the clamping pieces with a flange on which the fastener is intended to be secured.

The securing of the clip to the base of the fastener and the flange can be readily accomplished by pushing one of the relatively thin walls and the flange between the two clamping pieces, and the first and second barbs ensure a sufficient retaining force in each case. In particular, if an inner surface of one of the relatively thin walls is provided with a step portion which is adapted to be engaged by the first barb, the engagement between the clip and the base can be made highly secure. A particularly strong retaining force can be achieved in a simple manner if the clamping pieces are formed by bending a strip of sheet metal, and the first barb comprises a pair of tongues cut from two side edges of the corresponding clamping piece, and lifted toward the step portion.

The second barb may also be formed in a similar fashion. According to a particularly preferred embodiment of the present invention, one of the relatively thin walls has a break in a middle part thereof, and the second barb comprises a central barb which is adapted to engage the flange via the break in the relatively thin wall. By doing so, it is possible to engage the two sides of the flange with barbs in a highly secure manner. The central bard may consist of a central tongue cut from a middle part of the corresponding clamping piece, and lifted inward.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
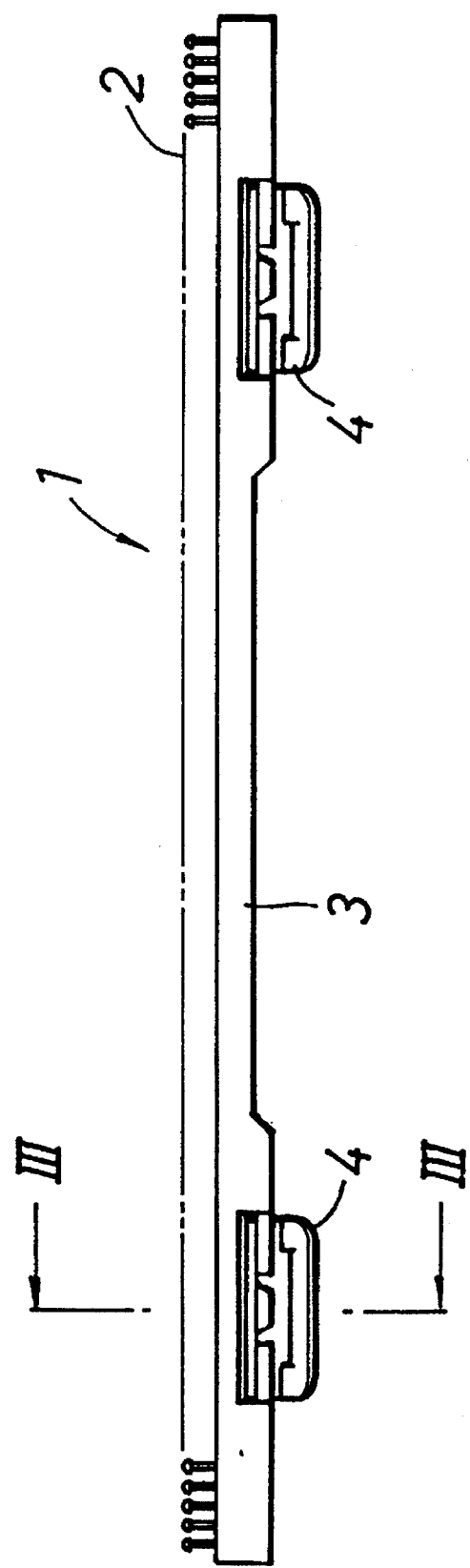
FIG. 1 is a front view of a preferred embodiment of the faster according to the present invention.

FIG. 1 shows a fastener 1 for temporarily securing a windshield to a vehicle body opening given as a preferred embodiment of the present invention. The fastener 1 comprises an elongated rectangular planar base 3 made of plastic material, a multitude of projections 2 integrally formed in regular rows and columns on one side of the base 3, and a pair of metallic clips 4 fitted into corresponding cavities 9 (FIG. 2) formed on the other side of the base 3 at two longitudinal end portions thereof. The projections 2 each consist of a rod shaped stem projecting upright from the base 3, and an enlarged head.

Figure 2:
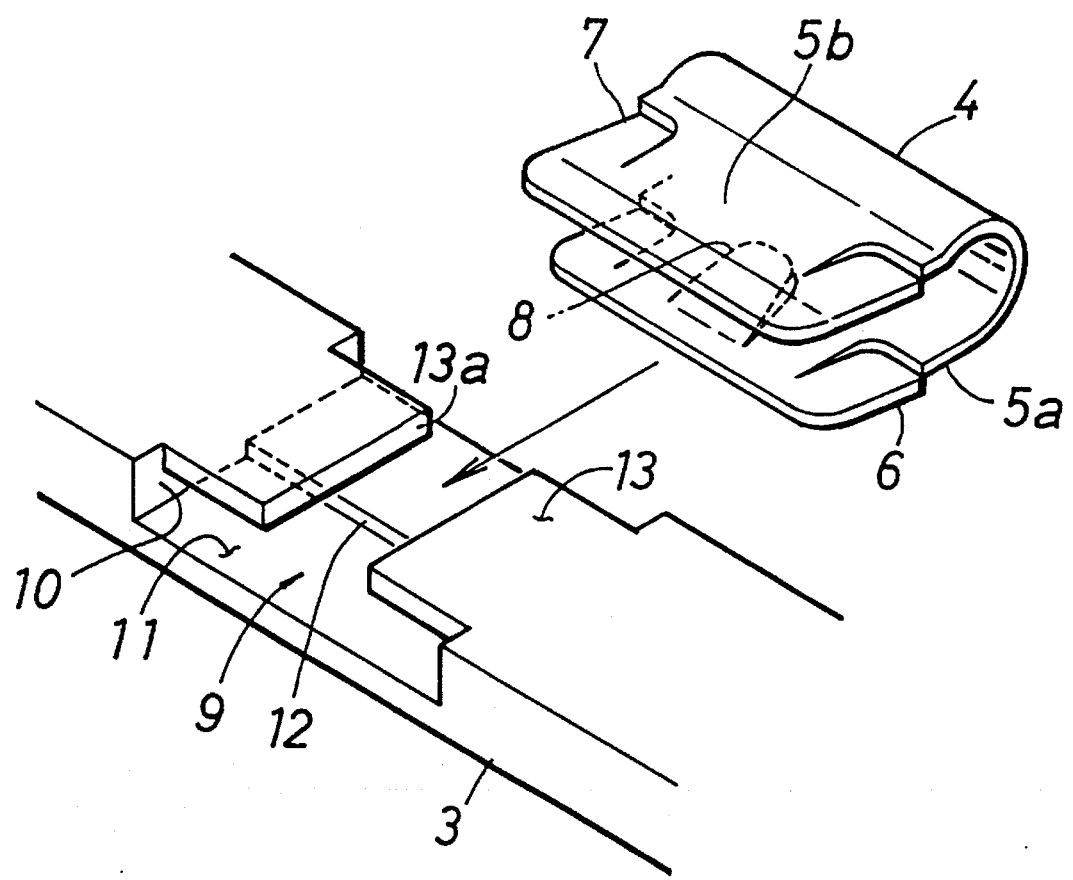
FIG. 2 is an exploded perspective view showing how the clip is fitted into the cavity provided in the FIG. 3 is an enlarged sectional view taken along line III—III of FIG. 1.

Referring to FIG. 2, each of the clips 4 comprises a pair of clamping pieces 5a and 5b bent from a single strip of sheet metal such as steel plate, and the opposing surfaces of the clamping pieces 5a and 5b are each provided with a pair of barbs 6 or 7 formed by cutting a pair of tongue pieces on either side of the clamping piece and lifting them outward in the case of the clamping piece 5a and inward in the case of clamping piece 5b. Additionally, one of the clamping pieces 5a is provided with a central barb 8 which is similarly formed by cutting a tongue piece and slightly lifting it inward.

Each of the cavities 9 comprises a rectangular bore 10 passed laterally across the base 3, a step 12 formed in the inner surface of one of the walls 11 of the rectangular bore 10 which are parallel to the major surface of the base 3, and a central gap 13a provided in the opposite wall 13. Thus, when one of the clamping pieces 5a provided with the central barb 8 and the side barbs 6 is fitted into the rectangular bore 10 from the narrow end or in the direction indicated by the arrow in FIG. 2, the clamping piece 5a is interposed between the two walls 11 and 13, and the two side barbs 6 of this clamping piece 5a is engaged by the step 12. Thus, the clip 4 is securely engaged in the cavity 9.

Figure 3:
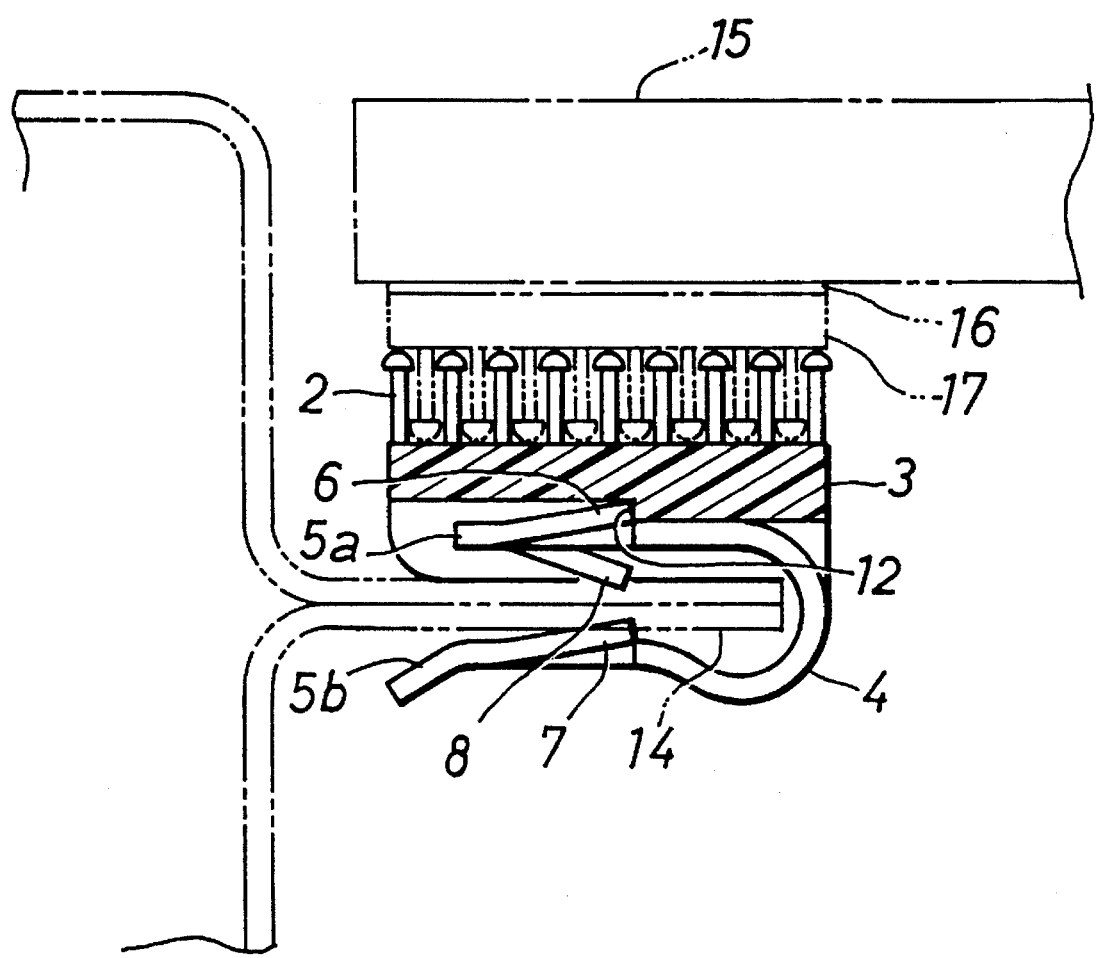

Referring to FIG. 3, When each of the clips 4 combined with the base 3 is pushed against an edge of a flange 14 provided in an opening of a vehicle body so as to receive the flange 14 between the two clamping pieces 5a and 5b, the inwardly directed barbs or the side barbs 7 of the clamping piece 5b and the central barb 8 are pressed against the opposing surfaces of the flange 14, and the clips 4 along with the base 3 of the fastener 1 are securely engaged by the flange 14.

A cooperating fastener 17 is attached to a corresponding peripheral part of a windshield 15 by means of adhesive tape 16 or other suitable means, and after applying a bonding agent to the flange 14 and/or the peripheral part of the windshield 15, the windshield 15 is pushed against the flange 14. The two cooperating fastener 1 and 17 are thus secured to each other, and can keep the windshield 15 fixed until the bonding agent filled in the gap between the windshield 15 and the flange 14 cures.

Thus, according to the present invention, the fastener can be secured to an arbitrary position around an opening of a vehicle body both in a simple and reliable manner without modifying the vehicle body structure. In particular, the barbs provided in the clamping pieces of the clips ensure a secure engagement between the fastener and the flange of the vehicle body. The present invention can achieve a simplification of a fabrication process end an improvement in the reliability in keeping the windshield immobile until the bonding agent cures.

Although the present invention has been described in terms of a specific embodiment thereof, it is possible to modify and alter details thereof without departing from the spirit of the present invention. For instance, the two opposing surfaces of the clamping pieces 5a and 5b were provided with barbs 8 and 7, but either the barb 8 or the barbs 7 may be omitted if desired. Also, the barbs 6 and 8 provided in one of the clamping pieces 5a may be modified so that the central barb 8 is lifted in the opposite direction for engagement with the step 12 while the side barbs 6 are likewise lifted in the opposite direction for engagement with the corresponding surface of the flange 14. Additionally, the step 12 may be formed in the other wall 13 and the barbs 6 may be accordingly lifted in the opposite direction.

What we claim is:

1. A fastener, comprising;

a planar base carrying attaching means on a major surface thereof and provided with a cavity passed through said base substantially in parallel with said major surface, thereby defining a pair of relatively thin walls both substantially in parallel with said major surface, said attaching means being adapted to be temporarily attached to cooperating attaching means provided on a cooperating fastener;

a clip including a pair of clamping pieces having a C-shaped cross-section and provided with a certain elasticity which urges said clamping pieces toward each other; one of said relatively thin walls being interposed between said clamping pieces by pushing on of said clamping pieces into said cavity;

said clamping pieces being provided with a first barb for engaging one of said clamping pieces with one of said relatively thin walls, and a second barb for engaging one of said clamping pieces with a flange on which said fastener is intended to be secured;

wherein an inner surface of one of said relatively thin walls is provided with a step portion which is adapted to be engaged by said first barb; and wherein said clamping pieces are formed by bending a strip of sheet metal, and said first barb comprises a pair of tongues cut from two side edges of the corresponding clamping piece, and lifted toward said step portion.

2. A fastener according to claim 1, wherein said second barb comprises a pair of tongues cut from two side edges of the corresponding clamping piece, and lifted inward.

3. A fastener according to claim 1, wherein said second barb comprises a central barb lifted inwardly for engaging with said flange.

4. A fastener according to claim 1 wherein said attaching means comprises a multitude of first projections and said cooperating attaching means comprising a multitude of second projections, and wherein first and second projections are adapted to interfit.

5. A fastener according to claim 4 wherein each of said first and second projections consist of a rod shaped stem and an enlarged head.

6. A fastener according to claim 1 wherein said flange is part of a windshield opening in a vehicle and said cooperating attaching means is attached to a peripheral part of a windshield.

7. A fastener, comprising:

a planar base carrying attaching means on a major surface thereof and provided with a cavity passed through said base substantially in parallel with said major surface, thereby defining a pair of relatively thin walls both substantially in parallel with said major surface, said attaching means being adapted to be temporarily attached to cooperating attaching means provided on a cooperating fastener;

a clip including a pair of clamping pieces having a C-shaped cross-section and provided with a certain elasticity which urges said clamping pieces toward each other; one of said relatively thin walls being interposed between said clamping pieces by pushing on of said clamping pieces into said cavity;

said clamping pieces being provided with a first barb for engaging one of said clamping pieces with one of said relatively thin walls, and a second barb for engaging one of said clamping pieces with a flange on which said fastener is intended to be secured; and wherein one of said relatively thin walls has a break in a middle part thereof, and said second barb comprises a central barb which is adapted to engage said flange via said break in said relatively thin wall.

8. A fastener according to claim 7, wherein an inner surface of the other of said relatively thin walls is provided with a step portion which is adapted to be engaged by said first barb.

9. A fastener according to claim 7, wherein said clamping pieces are formed by bending a strip of sheet metal, and said central barb comprises a central tongue cut from a middle part of the corresponding clamping piece, and lifted inward.

10. A fastener according to claim 7 wherein said flange is inserted between said base and an inner surface of one of said clamping pieces.

* * * * *